United States Patent
Ulavapalli et al.

(10) Patent No.: US 12,511,133 B2
(45) Date of Patent: Dec. 30, 2025

(54) AUTOMATED DEPLOYMENT OF CONFIGURATIONS FOR A MULTI-TENANT PLATFORM UP AN ENVIRONMENT CHAIN

(71) Applicant: Capital One Services, LLC, McLean, VA (US)

(72) Inventors: Prashant Ulavapalli, Pleasanton, CA (US); Andrew Pohlmann, Aubrey, TX (US); Martin Quish, Carrollton, TX (US); Leah Ferrell, McKinney, TX (US); Calvin Hoo, Plano, TX (US); Alan Ilango, McKinney, TX (US)

(73) Assignee: Capital One Services, LLC, McLean, VA (US)

( * ) Notice: Subject to any disclaimer, the term of this patent is extended or adjusted under 35 U.S.C. 154(b) by 155 days.

(21) Appl. No.: 18/493,114

(22) Filed: Oct. 24, 2023

(65) Prior Publication Data

US 2025/0130817 A1    Apr. 24, 2025

(51) Int. Cl.
G06F 9/445    (2018.01)
G06F 8/60    (2018.01)

(52) U.S. Cl.
CPC ............ *G06F 9/44505* (2013.01); *G06F 8/60* (2013.01)

(58) Field of Classification Search
CPC ............................... G06F 9/44505; G06F 8/60
USPC ........................................................ 713/100
See application file for complete search history.

(56) References Cited

U.S. PATENT DOCUMENTS

| | | | | |
|---|---|---|---|---|
| 6,298,354 | B1* | 10/2001 | Saulpaugh | ............ G06F 16/289 |
| 7,657,887 | B2* | 2/2010 | Kothandaraman | ..... H04L 67/06 |
| | | | | 717/176 |
| 8,595,810 | B1* | 11/2013 | Ben Ayed | ........... H04L 63/0815 |
| | | | | 713/168 |
| 10,275,237 | B1* | 4/2019 | Anderson | ................ G06F 8/75 |
| 10,585,877 | B1* | 3/2020 | Casazza | .................. G06F 16/80 |
| 10,592,391 | B1* | 3/2020 | Anderson | ........... G06F 11/3604 |
| 10,909,120 | B1* | 2/2021 | Mohamad | ......... G06F 16/24554 |
| 11,061,989 | B2* | 7/2021 | Pokrandt | ............. G06F 3/04847 |
| 11,080,043 | B1* | 8/2021 | Look | ........................ G06F 21/53 |
| 11,080,065 | B1* | 8/2021 | Reshadi | ................ H04L 67/564 |
| 2004/0117462 | A1* | 6/2004 | Bodin | ................ H04L 12/2809 |
| | | | | 709/220 |

(Continued)

OTHER PUBLICATIONS

Francis, Erik, "Configuration as Code: Everything You Need to Know." Dec. 18, 2018; 11 pages; downloaded Sep. 27, 2023; retrieved at https://www.cloudbees.com/blog/configuration-as-code-everything-need-know.

(Continued)

*Primary Examiner* — Paul R. Myers
(74) *Attorney, Agent, or Firm* — Harrity & Harrity, LLP (57) ABSTRACT

In some implementations, a device may retrieve a configuration package corresponding to one or more configurations used to establish an entity in a platform that integrates services of a plurality of first entities with platforms of a plurality of second entities. The device may cause deployment of the configuration package to a first environment of an environment chain of the platform. The device may cause, after deployment of the configuration package to the first environment, deployment of the configuration package to a second environment of the environment chain of the platform. Numerous other aspects are described.

20 Claims, 7 Drawing Sheets

(56) References Cited

U.S. PATENT DOCUMENTS

| | | | | |
|---|---|---|---|---|
| 2006/0168614 | A1* | 7/2006 | Salas | H04N 21/2547 |
| | | | | 348/E7.071 |
| 2007/0256056 | A1* | 11/2007 | Stern | G06F 9/44505 |
| | | | | 717/121 |
| 2008/0172357 | A1* | 7/2008 | Rechis | G06F 16/9537 |
| | | | | 715/767 |
| 2012/0226614 | A1* | 9/2012 | Gura | G06Q 30/0605 |
| | | | | 705/44 |
| 2015/0261824 | A1* | 9/2015 | Jha | G06F 16/24564 |
| | | | | 707/690 |
| 2016/0092628 | A1* | 3/2016 | Giguere | G06F 30/20 |
| | | | | 703/8 |
| 2016/0239280 | A1* | 8/2016 | Scheiner | G06F 8/60 |
| 2017/0034023 | A1* | 2/2017 | Nickolov | H04L 43/0817 |
| 2017/0147672 | A1* | 5/2017 | Arnold | H04L 67/565 |
| 2019/0305712 | A1* | 10/2019 | Hu | H04L 67/141 |
| 2021/0056121 | A1* | 2/2021 | Jayanthi | G06F 16/27 |
| 2021/0326358 | A1* | 10/2021 | Seelemann, II | G06F 16/273 |
| 2023/0076276 | A1 | 3/2023 | Parthasarathi et al. | |
| 2023/0185584 | A1* | 6/2023 | Casalino | G06F 16/212 |
| | | | | 713/1 |
| 2023/0236816 | A1* | 7/2023 | Bhutani | G06F 16/214 |
| | | | | 717/169 |
| 2024/0045842 | A1* | 2/2024 | Buehne | G06F 16/214 |

OTHER PUBLICATIONS

U.S. Appl. No. 17/173,531, filed Feb. 11, 2021.

* cited by examiner

AUTOMATED DEPLOYMENT OF CONFIGURATIONS FOR A MULTI-TENANT PLATFORM UP AN ENVIRONMENT CHAIN

BACKGROUND

Cloud computing refers to network-based on-demand availability of computer system resources, such as data storage and computing power. Cloud computing providers typically offer service according to different service models, including Infrastructure as a Service (IaaS), Platform as a Service (PaaS), and Software as a Service (SaaS). SaaS is a software delivery model in which software is centrally hosted and can be accessed by users via the internet.

SUMMARY

Some implementations described herein relate to a system for automated deployment of configurations for a multi-tenant platform up an environment chain. The system may include one or more memories and one or more processors communicatively coupled to the one or more memories. The one or more processors may be configured to receive information identifying one or more parameters for one or more configurations used to establish an entity in a software as a service (SaaS) platform that integrates services of a plurality of first entities with platforms of a plurality of second entities. Establishing the entity in the SaaS platform may establish the entity as one of the plurality of first entities or one of the plurality of second entities. The one or more processors may be configured to generate the one or more configurations using the one or more parameters, where the one or more configurations are to be stored in a version control system. The one or more processors may be configured to cause building of a configuration package corresponding to the one or more configurations and at least one additional configuration for at least one additional entity of the plurality of first entities or the plurality of second entities. The one or more processors may be configured to cause deployment of the configuration package to a non-production environment of the SaaS platform, where deployment of the configuration package to the non-production environment causes the one or more parameters of the one or more configurations to be written to a first database associated with the non-production environment. The one or more processors may be configured to cause, responsive to testing information associated with deployment of the configuration package to the non-production environment, deployment of the configuration package to a production environment of the SaaS platform, where deployment of the configuration package to the production environment causes the one or more parameters of the one or more configurations to be written to a second database associated with the production environment.

Some implementations described herein relate to a method of automated deployment of configurations for a multi-tenant platform up an environment chain. The method may include retrieving, by a device from a version control system, a configuration package corresponding to one or more configurations used to establish an entity in a platform that integrates services of a plurality of first entities with platforms of a plurality of second entities. Establishing the entity in the platform establishes the entity as one of the plurality of first entities or one of the plurality of second entities. The method may include causing, by the device, deployment of the configuration package to a first environment of an environment chain of the platform, where deployment of the configuration package to the first environment causes the one or more parameters of the one or more configurations to be written to a first database associated with the first environment. The method may include causing, by the device after deployment of the configuration package to the first environment, deployment of the configuration package to a second environment of the environment chain of the platform, where deployment of the configuration package to the second environment causes the one or more parameters of the one or more configurations to be written to a second database associated with the second environment.

Some implementations described herein relate to a non-transitory computer-readable medium that stores a set of instructions for automated deployment of a configuration package up an environment chain. The set of instructions, when executed by one or more processors of a device, may cause the device to retrieve, from a version control system, a configuration package corresponding to one or more configurations used to establish an entity in a multi-tenant platform. The set of instructions, when executed by one or more processors of the device, may cause the device to cause deployment of the configuration package to a first environment of the multi-tenant platform. The set of instructions, when executed by one or more processors of the device, may cause the device to cause, responsive to deployment of the configuration package to the first environment passing testing, deployment of the configuration package to a second environment of the multi-tenant platform.

DETAILED DESCRIPTION

The following detailed description of example implementations refers to the accompanying drawings. The same reference numbers in different drawings may identify the same or similar elements.

A multi-tenant platform may include a shared computing platform that serves multiple tenants while isolating the data and/or configurations of the tenants. A single-tenant platform may include a system in which multiple tenants are provided with separate, dedicated instances of an application or computing environment. Occasionally, a new entity (e.g., a user) may be onboarded to a platform. In general, onboarding the new entity may include the installation of a configuration for the entity in the platform. For example, configuration information for the entity may be written to a database associated with the platform. This may involve preparing code that executes the database queries for writing the configuration information to the database. Preparing the code can be time consuming, thereby consuming excessive computing resources used for preparing the code. Moreover, the resulting code may include errors that can destabilize a computing infrastructure executing the code and/or destabilize the database.

This process may be exacerbated by the fact that the platform can have numerous configurations which can be updated from time to time, such that the process is performed repetitively. Moreover, the platform may have multiple environments used for testing and production, and the configuration may be migrated between environments. Each migration may also involve the process of preparing the code to execute the database queries. Accordingly, there may be significant compounding of computing resource consumption and/or code errors as configurations are promoted to different environments.

Some implementations described herein enable automated deployment of configurations used to onboard an entity in a platform (e.g., a multi-tenant platform or a single tenant platform). Furthermore, the automated deployment may facilitate migration between multiple environments of the platform. In some implementations, one or more parameters for one or more configuration associated with the entity may be added or updated via a user interface. Adding or updating the parameters may cause a system to generate the configurations (e.g., generate configuration files) using the parameters. By using the user interface for parameter entry, errors typically associated with preparing code to execute database queries can be reduced, and computing resources that may otherwise be consumed by code preparation can be conserved.

The system may then cause building of a configuration package corresponding to the configurations. Once built into the configuration package, the configurations may be immutable, thereby facilitating migration of the configurations between environments of the platform with consistency and reduced errors. In some implementations, the configuration package may include a deployment artifact configured to read (e.g., extract) the parameters for the configurations, to generate database queries using the parameters, and/or to execute the database queries.

The system may cause deployment of the configuration package to an environment of the platform (e.g., by providing the configuration package to a cloud computing system), which in turn causes the parameters of the configurations to be written to a database associated with the environment. For example, the parameters of the configurations may be written to the database using the deployment artifact of the configuration package. Furthermore, in connection with promotion to a new environment of the platform, the system may cause deployment of the configuration package to the new environment, in a similar manner as described above, and so forth for each new environment of the platform. In this way, the entity may be onboarded in each environment of the platform efficiently and with reduced database insertion or updating errors, thereby improving database and/or platform stability.

FIGS. 1A-1D are diagrams of an example 100 associated with automated deployment of configurations for a multi-tenant platform up an environment chain. As shown in FIGS. 1A-1D, example 100 includes a build system, a user device, a version control system, an integration platform, and a cloud computing system. These devices are described in more detail in connection with FIGS. 2 and 3.

The build system may include an orchestration component configured to perform one or more actions described herein. The user device may be associated with a back-end user, such as an administrator, of the integration platform. The integration platform may be a multi-tenant or a single-tenant platform. For example, the integration platform may be a SaaS platform. In some implementations, the integration platform may include an environment chain associated with a plurality of environments that implement aspects of the integration platform at various development stages. For example, the environment chain may include one or more non-production environments (e.g., any environments other than a production environment) and a production environment. In some implementations, the integration platform may be part of, or implemented in, the cloud computing system.

The integration platform may integrate services of a plurality of first entities with platforms (e.g., digital platforms, such as websites, mobile applications, or the like) of a plurality of second entities. For example, the integration platform facilitates the offering of the services of the first entities to the users of the platforms of the second entities. In some implementations, the integration platform may be a multi-lender platform. For example, the services of the first entities may be lending services and the platforms of the second entities may be digital marketplaces (e.g., for online vehicle shopping) that provide financing options to customers.

The first entities and the second entities that participate in the integration platform may change over time. Accordingly, a new entity (e.g., of the first entity type or the second entity type) may be onboarded to the integration platform by registering settings and/or preferences associated with the entity in one or more configurations implemented in the integration platform. Additionally, or alternatively, updated settings and/or preferences of an entity can be re-registered in the configurations implemented in the integration platform. An entity that is onboarded to the integration platform can participate as one of the first entities (e.g., by providing lending services) or one of the second entities (e.g., by offering financing for purchases using the lending services of the first entities).

In some implementations, one or more of the build system, the version control system, the integration platform, and/or the cloud computing system may include one or more of the other systems or platforms described herein. In some implementations, a system may include one or more of the build system, the version control system, the integration platform, and/or the cloud computing system.

Figure 1A:
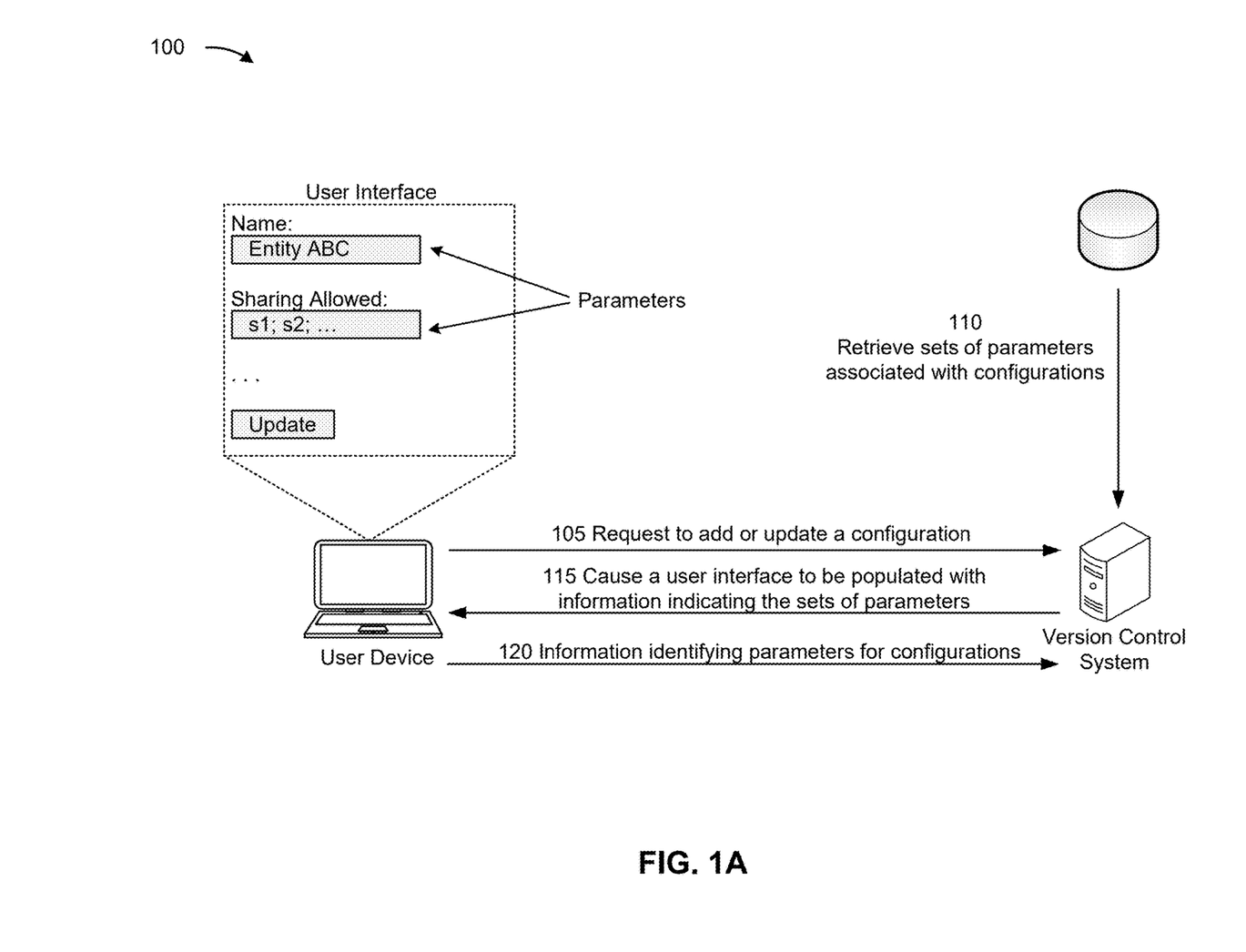
FIGS. 1A-1D are diagrams of an example associated with automated deployment of configurations for a multi-tenant platform up an environment chain, in accordance with some embodiments of the present disclosure.

As shown in FIG. 1A, and by reference number 105, the user device may transmit, and the version control system may receive, a request to add or update a configuration associated with an entity in the integration platform. Adding or updating the entity in the integration platform may be referred to herein as "establishing" the entity in the integration platform. In some implementations, the user device may transmit the request via a user interface presented on a display of the user device.

As shown by reference number 110, if the request is to update a configuration, the version control system may retrieve (e.g., from a data structure, such as a database) one or more sets of parameters associated with a current version of one or more configurations associated with the entity. For example, the version control system may retrieve the sets of parameters from a database of an environment of the environment chain (e.g., the first database or the second database, described in connection with FIGS. 1C and 1D). Each set of parameters may be for a respective configuration associated with the entity.

As shown by reference number 115, the version control system may cause the user interface to be populated with information indicating the sets of parameters. For example, the version control system may transmit, and the user device may receive, the information indicating the sets of parameters. The information indicating the sets of parameters may be in one or more files, may be populated in input fields of the user interface, such as editable text fields or the like. Accordingly, the back-end user may edit parameters, of the sets of parameters, via the inputs fields of the user interface. In a case in which the request is to add a configuration, the input fields of the user interface may be unpopulated to allow the back-end user to input the parameters via the input fields.

As shown by reference number 120, the user device may transmit, and the version control system may receive, information identifying one or more parameters for the one or more configurations. In some implementations, the version control system may receive the information via the user interface. For example, as described herein, the back-end user may update or add parameter(s) for the configuration(s) via the user interface to cause transmission of the information identifying the parameter(s) for the configuration(s) to the version control system. The information may identify one or more complete sets of parameters and/or one or more updated parameters. For example, the parameter(s) indicated by the information may be updates to the sets of parameters. As described herein, the configuration(s) may be used to establish the entity in the integration platform (e.g., add or update configuration information relating to the entity in the integration platform, which provides onboarding of the entity to the integration platform). For example, establishing the entity in the integration platform establishes the entity as one of the first entities or one of the second entities (e.g., thus allowing the entity to participate in the integration platform).

The configuration(s) may be particular to the entity. The parameter(s) may include metadata relating to the entity. For example, the parameter(s) may indicate settings for the entity and/or preferences of the entity, among other examples. In some implementations, the parameter(s) may be for a first configuration relating to the entity. The first configuration may provide configuration information associated with the entity that is the first entity type. For example, parameters associated with the first configuration may include a name of the entity, a unique identifier associated with the entity, a display name for the entity in the integration platform, an address of the entity, or the like.

In some implementations, the parameter(s) may be for a second configuration relating to the entity. The second configuration may provide configuration information associated with the entity that is the second entity type. For example, parameters associated with the second configuration may include a name of the entity, a unique identifier associated with the entity, a display name for the entity in the integration platform, an address of the entity, a list of other entities of the second entity type that can interact with the entity through the integration platform, a list of other entities of the second entity type that the entity with which the entity is allowing sharing (e.g., sharing of financing applications made to the entity), or the like.

In some implementations, the parameter(s) may be for a third configuration relating to the entity. The third configuration may provide configuration information associated with eligibility rules for the entity. The eligibility rules may indicate rules that a user of a platform (e.g., a website associated with a marketplace) must satisfy in order to use services (e.g., lending services) through the platform. For example, the eligibility rules may relate to eligibility for using a lender of a multi-lender platform. As an example, parameters associated with the third configuration may include a minimum credit score that a user must have to be eligible to use services of the entity, whether a user with a missing credit score is eligible to use services of the entity, whether a user declined by another entity is eligible to use services of the entity, or the like. In some implementations, the build system may perform, and/or may cause the version control system to perform (e.g., via a communication interface between the build system and the version control system, such as an application programming interface (API)), one or more of the operations described in connection with reference numbers 105, 110, 115, and/or 120.

Figure 1B:
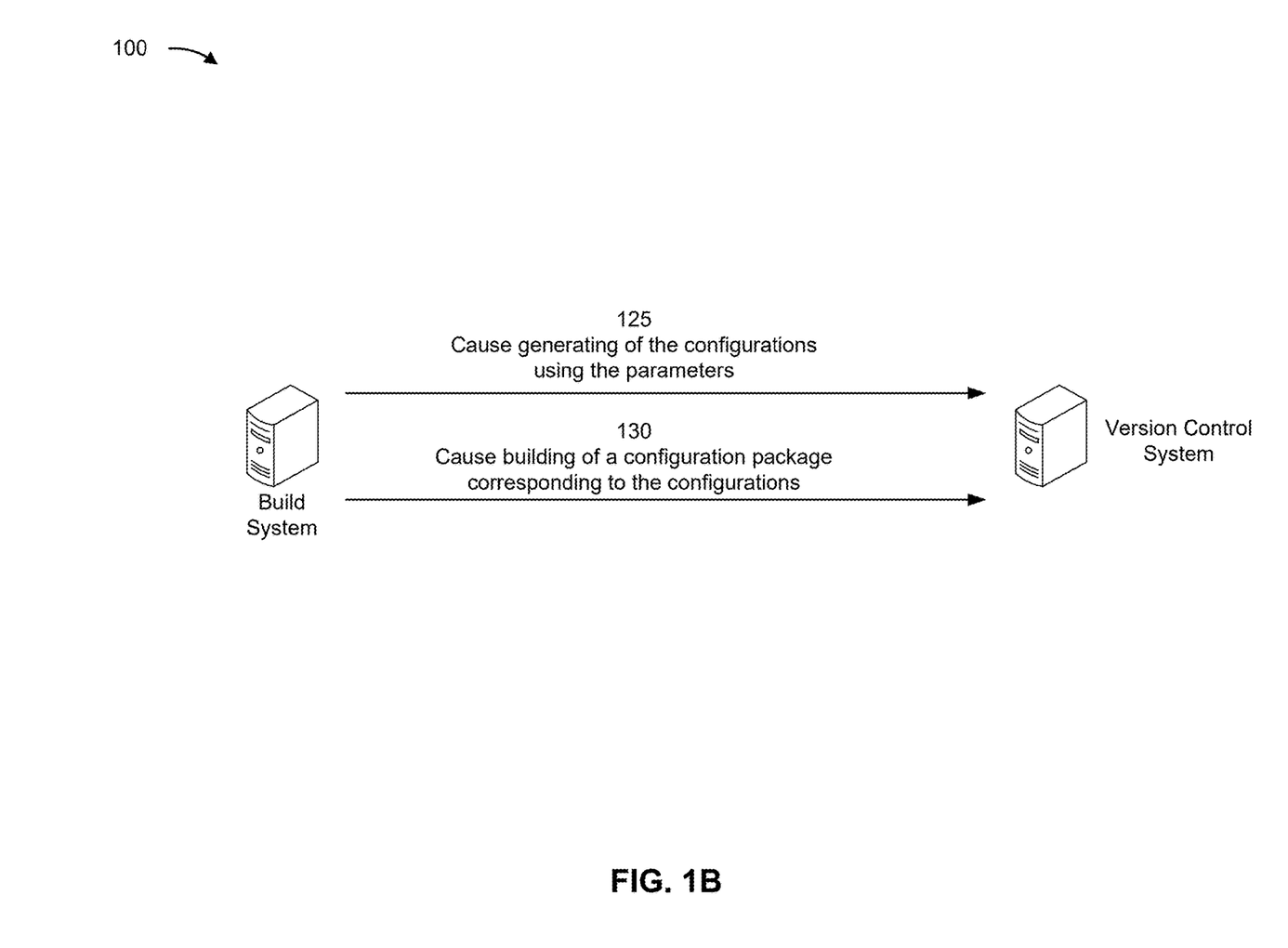

As shown in FIG. 1B, and by reference number 125, the build system may cause generation of the configuration(s) using the parameter(s) received from the user device. For example, the build system may cause generation of one or more files identifying the configuration(s). The files may represent the parameter(s) for the configuration(s) in any suitable format, such as JavaScript Object Notation (JSON), Extensible Markup Language (XML), YAML Ain't Markup Language (YAML), or the like. In some implementations, a separate file may be used for each configuration.

The configuration(s) may be stored in the version control system (e.g., in a repository of the version control system). Thus, the configuration(s) may be associated with a version number. In some implementations, the build system may cause the version control system to generate and/or update the configuration(s). In some implementations, the version control system may generate and/or update the configuration(s) responsive to a user input. In addition to the configuration(s) for the entity, the version control system may store at least one additional configuration (similar to the configuration(s)) associated with at least one additional entity of the plurality of first entities or the plurality of second entities. For example, the version control system may store a plurality of additional configurations.

In some implementations, the configuration(s) being stored in (e.g., added to or updated in) the version control system may result in the performance of a review of the configuration(s). For example, the updates to the configuration(s) may result in the performance of a review of the configuration(s). In some implementations, the configuration(s) being stored in the version control system may cause an automated review (e.g., linting) of the configuration(s) to be performed (e.g., by the version control system). The review (e.g., an automated review or otherwise) may check the configuration(s) for syntax, formatting errors, or the like. In some implementations, the build system and/or the version control system may receive error outputs in connection with the review, and the build system and/or the version control system may be configured to automatically make corrections to the configuration(s) based on the error outputs.

As shown by reference number 130, the build system may cause building (e.g., generating) of a configuration package corresponding to the configuration(s). For example, the build system may cause building of the configuration package if the configuration(s) have passed a review. In some implementations, the build system may retrieve the configuration(s) (e.g., a copy of the configuration(s)) from the version control system for building of the configuration package. Accordingly, the build system may build the configuration package based on the configuration(s) retrieved from the version control system. In some implementations, the build system may perform an automated review (e.g., linting) of the retrieved configuration(s) prior to building the configuration package (e.g., the build system may make corrections to the configuration(s) based on errors found in the review and/or may build the configuration package if the configuration(s) pass the review). In some implementations, the build system may transmit a command to the version control system, or to another device that can access the version control system, to build the configuration package, thereby causing building of the configuration package. In some implementations, the version control system may build the configuration package responsive to a user input. Accordingly, the build system may retrieve the configuration package from the version control system.

In some implementations, the configuration package may correspond to the configuration(s) and at least one additional configuration for at least one additional entity of the plurality of first entities or the plurality of second entities. The configuration(s) may identify one or more parameters that are added or updated, and the at least one additional configuration may be unchanged from a previous version. For example, the configuration package may correspond to each of the plurality of configurations for the plurality of entities stored in the version control system (e.g., regardless of whether the configurations have been newly added, updated, or are unchanged). In other words, each build of the configuration package includes all of the configurations for all of the entities associated with the integration platform.

The configuration package may include one or more artifacts based on the configuration(s) (e.g., the configuration package may include a package artifact). An artifact may be an executable file that can be installed on the integration platform in connection with deploying the configuration package to the integration platform. Accordingly, the configuration package may make the configuration(s) immutable between environments of the environment chain of the integration platform, thereby facilitating migration of the configuration(s) between environments of the integration platform with consistency and reduced errors. Moreover, the configuration package may include a deployment artifact configured to read (e.g., extract) the parameter(s) for the configuration(s), to generate database queries using the parameter(s), and/or to execute the database queries (e.g., by providing the database queries to a database).

Figure 1C:
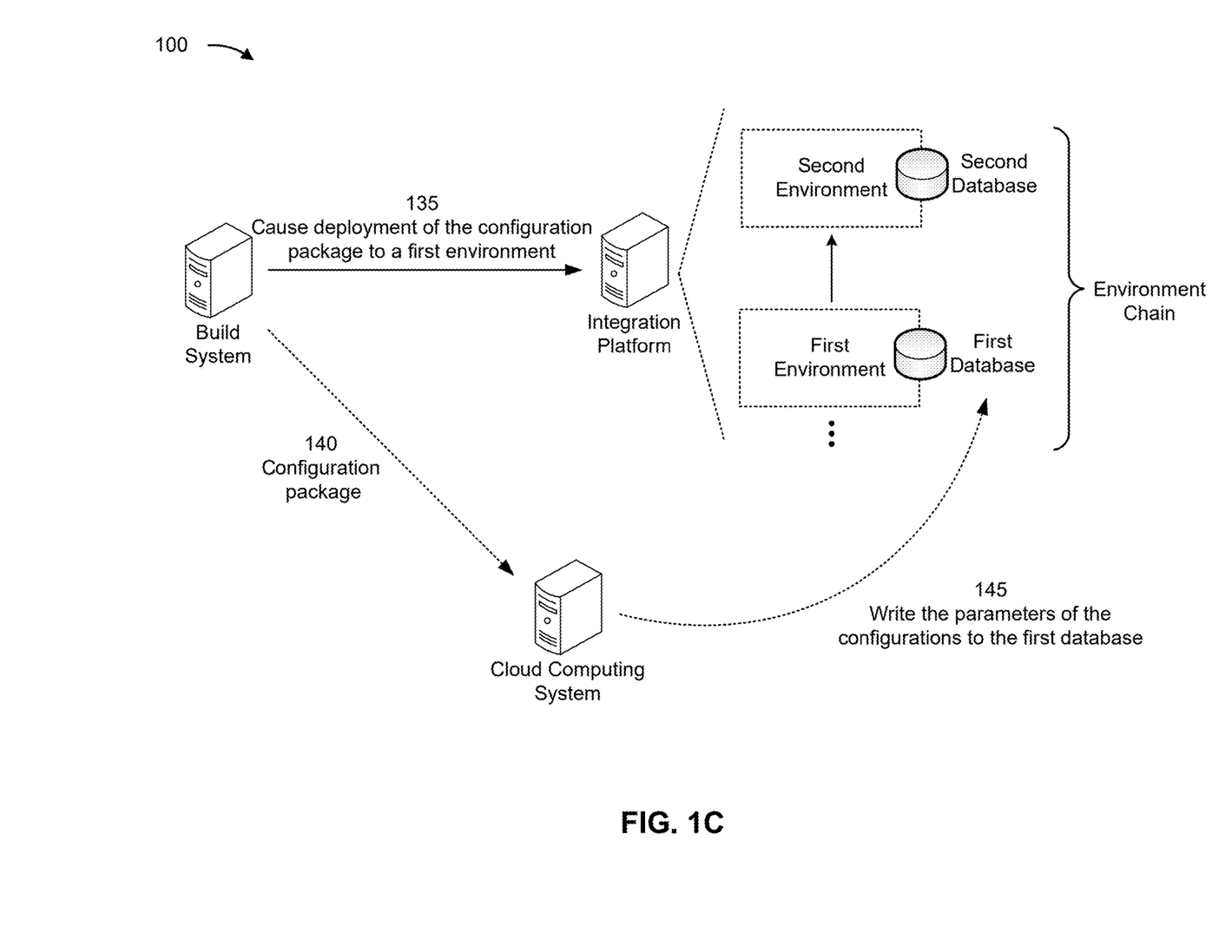

As shown in FIG. 1C, and by reference number 135, the build system may cause deployment of the configuration package to a first environment of the environment chain of the integration platform. The first environment may be a non-production environment, such as a development environment, a test environment, a staging environment, or the like. Deployment of the configuration package to the first environment may cause the parameter(s) for the configuration(s) (as well as the additional configuration(s)), as indicated in the configuration package, to be written to a first database associated with the first environment. In other words, deployment of the configuration package to the first environment may cause the first environment to be configured in accordance with the configuration(s) (as well as the additional configuration(s)). In this way, the entity may be established in the first environment of the integration platform efficiently and with reduced database insertion or updating errors.

In some implementations, to cause deployment of the configuration package to the first environment, the build system may provide the configuration package to a cloud computing system, as shown by reference number 140. The configuration package being provided to the cloud computing system may cause the cloud computing system to write the parameter(s) for the one or more configurations to the first database, as shown by reference number 145. In particular, the build system may provide the configuration package to a storage component of the cloud computing system. The configuration package being provided to the storage component may cause the storage component to generate a message in a message queue of the cloud computing system. The message may cause a deployment component of the cloud computing system (e.g., the deployment component is configured to consume messages of the message queue) to retrieve the configuration package from the storage component, and to execute database queries to write the parameter(s) for the configuration(s) to the first database (e.g., using the deployment artifact of the configuration package). The deployment component may be a computing instance, a serverless function, or the like, of the cloud computing system.

Deployment of the configuration package to the first environment may cause testing to be performed with respect to the deployment of the configuration package to the first environment (e.g., the testing may be performed automatically responsive to the deployment of the configuration package). For example, the testing may be performed to determine whether establishment of the entity in the first environment succeeded (e.g., did not cause errors). In some implementations, the build system may perform the testing. For example, the build system may transmit requests (e.g., Hypertext Transfer Protocol (HTTP) requests) to the first environment of the integration platform (e.g., in connection with the entity), and may analyze responses to the requests to determine whether errors occurred. Additionally, or alternatively, the integration platform may perform the testing. In some implementations, the testing (e.g., performed by the build system and/or the integration platform) may test whether various functionality that uses the parameter(s) for the configuration(s) executes correctly in the first environment. Additionally, or alternatively, the testing (e.g., performed by the build system and/or the integration platform) may simulate a user interacting with various functionality that uses the parameter(s) for the configuration(s) to test whether the functionality executes correctly in the first environment (e.g., a user behavior may be simulated using a series of steps, as defined in code, for interacting with the functionality).

Figure 1D:
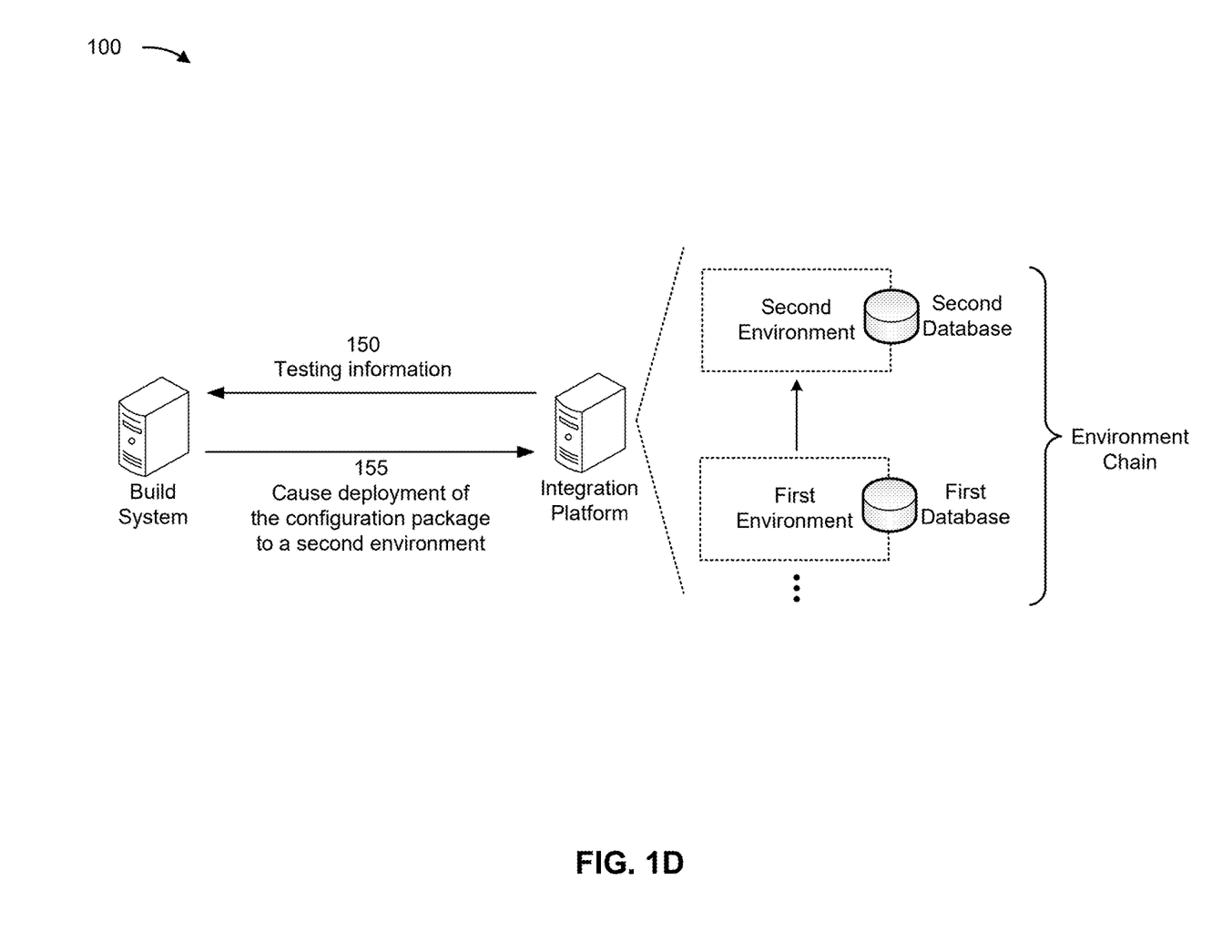

As shown in FIG. 1D, and by reference number 150, the integration platform may transmit, and the build system may receive, testing information. The testing information may relate to the testing performed by the integration platform. For example, the testing information may indicate that deployment of the configuration package to the first environment has passed testing (e.g., establishment of the entity was successful) or that deployment of the configuration package to the first environment has failed testing (e.g., establishment of the entity was unsuccessful). Additionally, or alternatively, the build system may generate the testing information based on testing performed by the build system. Additionally, or alternatively, the build system may receive the testing information from a user device based on testing performed by a user of the user device.

As shown by reference number 155, the build system may cause deployment of the configuration package to a second environment of the environment chain of the integration platform. The second environment may be a production environment. Alternatively, the second environment may be a non-production environment that is higher up the environment chain than the first environment (e.g., the first environment may be a test environment, and the second environment may be a staging environment). Deployment of the configuration package to the second environment may cause the parameter(s) for the configuration(s) (as well as the additional configuration(s)), as indicated in the configuration package, to be written to a second database associated with the second environment. In other words, deployment of the configuration package to the second environment may cause the second environment to be configured in accordance with the configuration(s) (as well as the additional configuration(s)). In this way, the entity may be established in the second environment of the integration platform efficiently and with reduced database insertion or updating errors.

The build system may cause deployment of the configuration package to the second environment after deployment of the configuration package to the first environment. For example, the build system may cause deployment of the configuration package to the second environment responsive to the testing information associated with deployment of the configuration package to the first environment. In particular, the build system may cause deployment of the configuration package to the second environment responsive to deployment of the configuration package to the first environment passing testing (e.g., as indicated by the testing information).

In some implementations, to cause deployment of the configuration package to the second environment, the build system may provide the configuration package to the cloud computing system, and the configuration package being provided to the cloud computing system may cause the cloud computing system to write the parameter(s) for the one or more configurations to the second database, in a similar manner as described herein. In addition, deployment of the configuration package to the second environment may cause testing to be performed with respect to the deployment of the configuration package to the second environment, in a similar manner as described herein. In examples in which the second environment is a non-production environment, the configuration package may be deployed one or more times to higher-level environments of the environment chain until deployment in the production environment, in a similar manner as described herein. Furthermore, subsequent changes to one or more parameters of one or more configurations associated with the entity may be performed through the user interface, thereby triggering building and deployment of a new configuration package, in a similar manner as described herein.

In this way, the entity may be onboarded in each environment of the integration platform efficiently and with reduced database insertion or updating errors, thereby improving database and/or platform stability.

As indicated above, FIGS. 1A-1D are provided as an example. Other examples may differ from what is described with regard to FIGS. 1A-1D.

Figure 2:
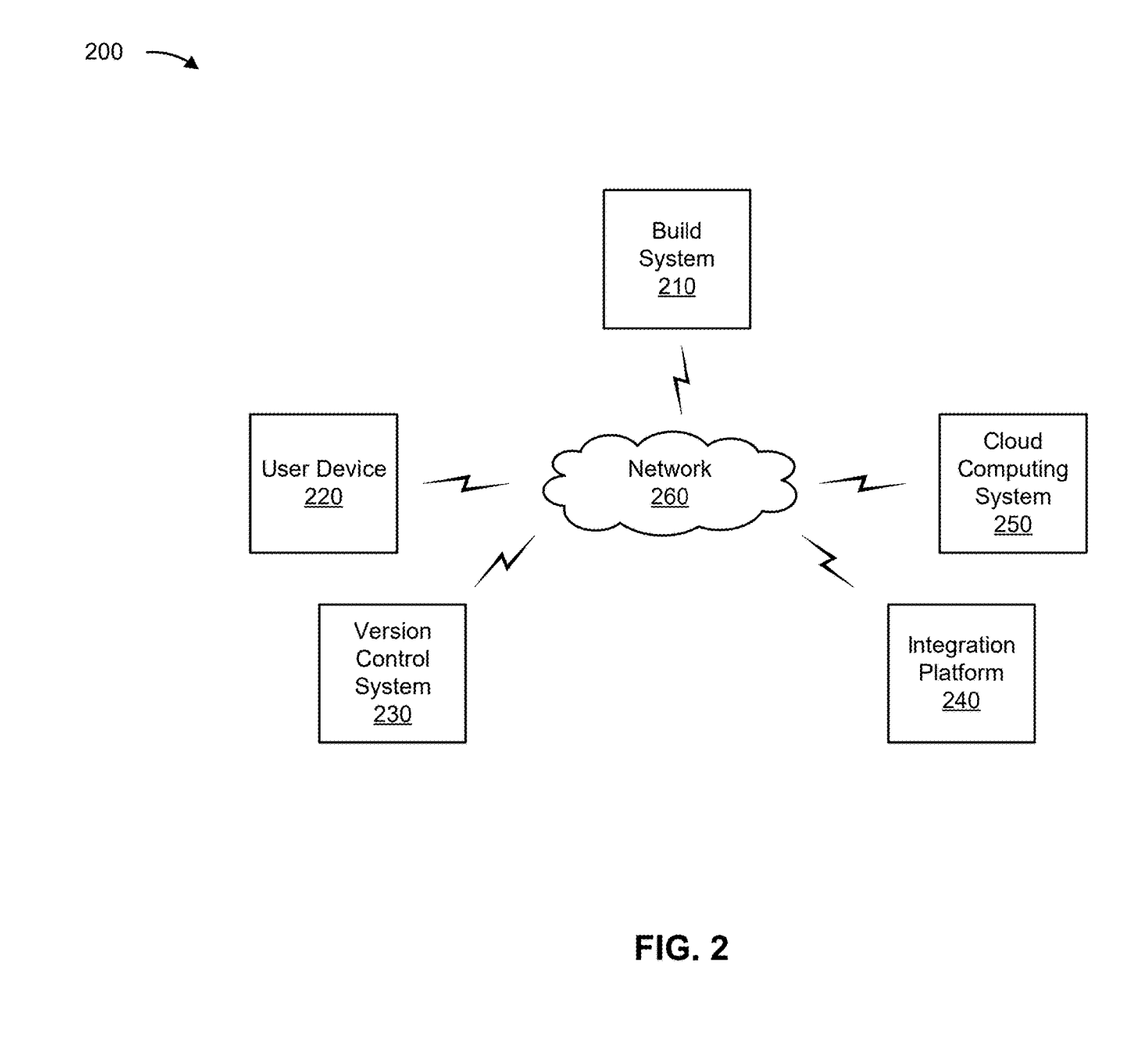
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a build system 210, a user device 220, a version control system 230, an integration platform 240, cloud computing system 250, and a network 260. Devices of environment 200 may interconnect via wired connections, wireless connections, or a combination of wired and wireless connections.

The build system 210 may include one or more devices capable of receiving, generating, storing, processing, providing, and/or routing information associated with automated deployment of configurations for a multi-tenant platform up an environment chain, as described elsewhere herein. The build system 210 may include a communication device and/or a computing device. For example, the build system 210 may include a server, such as an application server, a client server, a web server, a database server, a host server, a proxy server, a virtual server (e.g., executing on computing hardware), or a server in a cloud computing system. In some implementations, the build system 210 may include computing hardware used in a cloud computing environment.

The user device 220 may include one or more devices capable of receiving, generating, storing, processing, and/or providing information associated with adding or updating one or more parameters of one or more configurations associated with an entity, as described elsewhere herein. The user device 220 may include a communication device and/or a computing device. For example, the user device 220 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The version control system 230 may include one or more devices capable of receiving, generating, storing, processing, providing, and/or routing information associated with configuration version control or a configuration repository, as described elsewhere herein. The version control system 230 may include a communication device and/or a computing device. For example, the version control system 230 may include a server, such as an application server, a client server, a web server, a database server, a host server, a proxy server, a virtual server (e.g., executing on computing hardware), or a server in a cloud computing system. In some implementations, the version control system 230 may include computing hardware used in a cloud computing environment.

The integration platform 240 may include one or more devices capable of receiving, generating, storing, processing, providing, and/or routing information associated with an environment (e.g., a non-production environment or a production environment), as described elsewhere herein. The integration platform 240 may include a communication device and/or a computing device. For example, the integration platform 240 may include a server, such as an application server, a client server, a web server, a database server, a host server, a proxy server, a virtual server (e.g., executing on computing hardware), or a server in a cloud computing system. In some implementations, the integration platform 240 may include computing hardware used in a cloud computing environment.

The cloud computing system 250 may include one or more devices capable of receiving, generating, storing, processing, providing, and/or routing information associated with automated deployment of configurations for a multi-tenant platform up an environment chain, as described elsewhere herein. The cloud computing system 250 may include a communication device and/or a computing device. For example, the cloud computing system 250 may include a server, such as an application server, a client server, a web server, a database server, a host server, a proxy server, a virtual server (e.g., executing on computing hardware), or a server in a cloud computing system. In some implementations, the cloud computing system 250 may include computing hardware used in a cloud computing environment.

The network 260 may include one or more wired and/or wireless networks. For example, the network 260 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 260 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
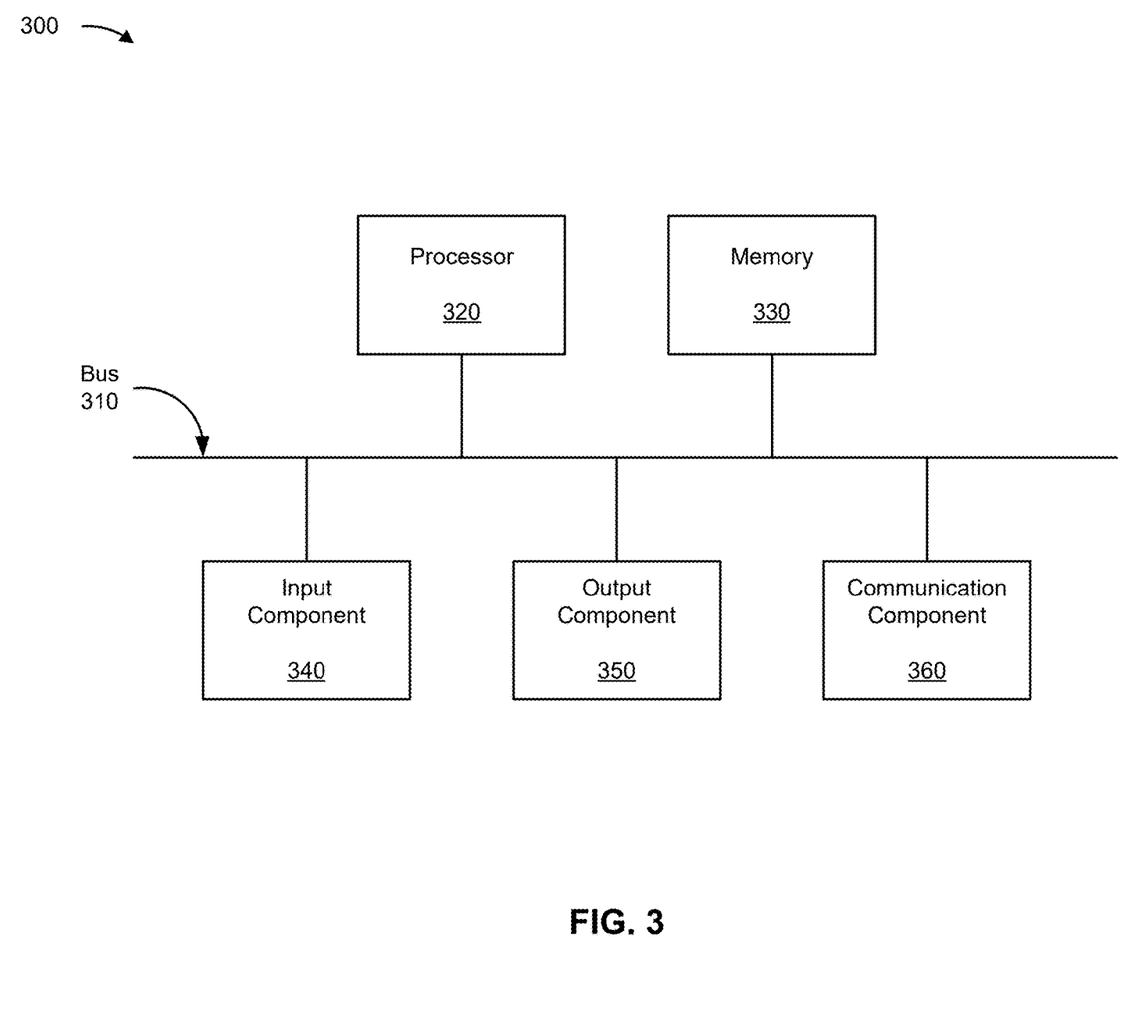
FIG. 3 is a diagram of example components of a device associated with automated deployment of configurations for a multi-tenant platform up an environment chain, in accordance with some embodiments of the present disclosure.

FIG. 3 is a diagram of example components of a device 300 associated with automated deployment of configurations for a multi-tenant platform up an environment chain. The device 300 may correspond to build system 210, user device 220, version control system 230, integration platform 240, and/or cloud computing system 250. In some implementations, build system 210, user device 220, version control system 230, integration platform 240, and/or cloud computing system 250 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
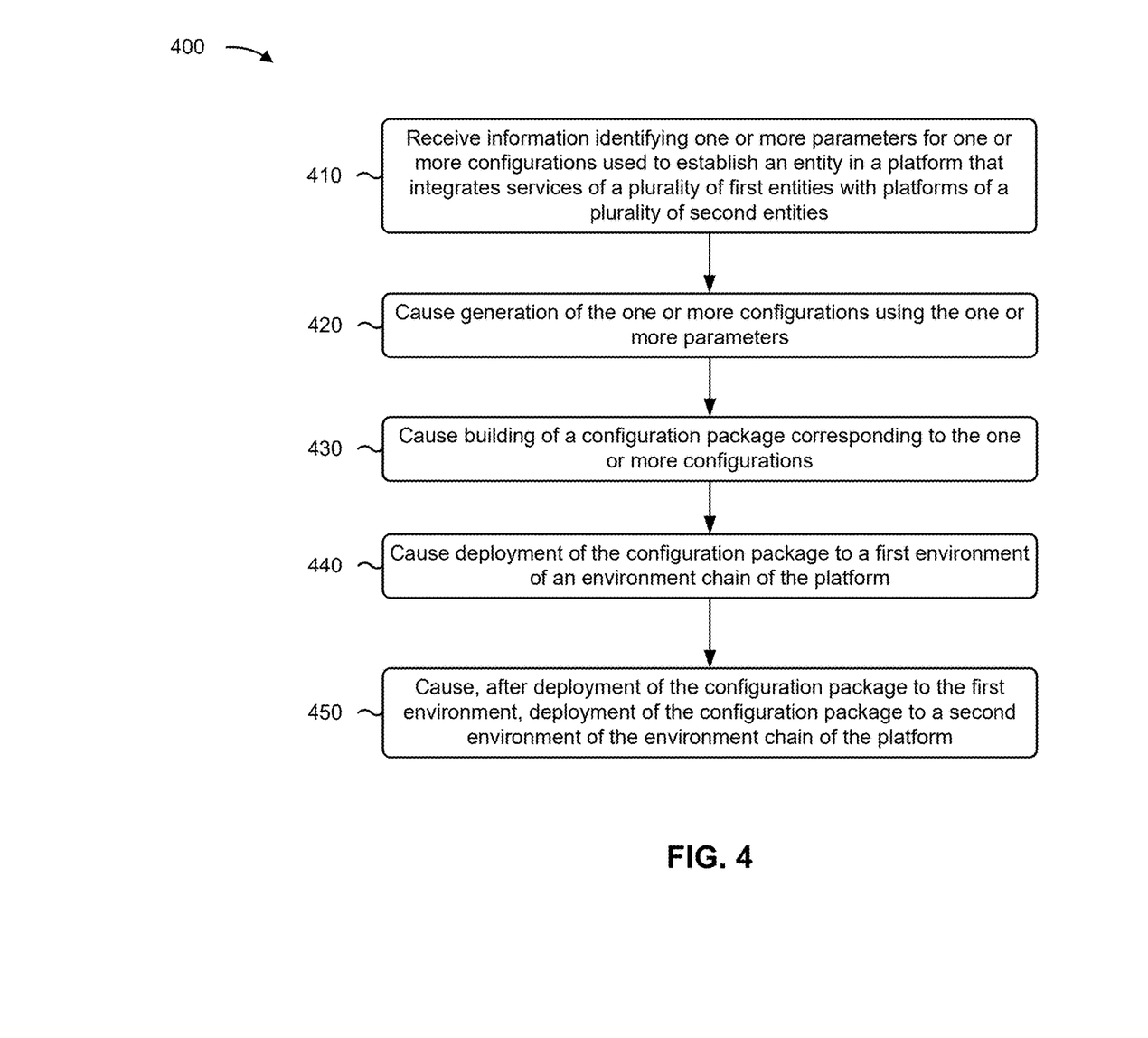
FIG. 4 is a flowchart of an example process associated with automated deployment of configurations for a multi-tenant platform up an environment chain, in accordance with some embodiments of the present disclosure.

FIG. 4 is a flowchart of an example process 400 associated with automated deployment of configurations for a multi-tenant platform up an environment chain. In some implementations, one or more process blocks of FIG. 4 may be performed by the build system 210. In some implementations, one or more process blocks of FIG. 4 may be performed by another device or a group of devices separate from or including the build system 210, such as the user device 220, the version control system 230, the integration platform 240, and/or the cloud computing system 250. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include receiving information identifying one or more parameters for one or more configurations used to establish an entity in a platform that integrates services of a plurality of first entities with platforms of a plurality of second entities (block 410). For example, the build system 210 (e.g., using processor 320, memory 330, input component 340, and/or communication component 360) may receive information identifying one or more parameters for one or more configurations used to establish an entity in a platform that integrates services of a plurality of first entities with platforms of a plurality of second entities, as described above in connection with reference number 120 of FIG. 1A. As an example, a back-end user may update or add parameter(s) for the configuration(s) via a user interface to cause transmission of the information identifying the parameter(s) for the configuration(s). In some implementations, establishing the entity in the platform establishes the entity as one of the plurality of first entities or one of the plurality of second entities.

As further shown in FIG. 4, process 400 may include causing generation of the one or more configurations using the one or more parameters (block 420). For example, the build system 210 (e.g., using processor 320, memory 330, and/or communication component 360) may cause generation of the one or more configurations using the one or more parameters, as described above in connection with reference number 125 of FIG. 1B. As an example, the configuration(s) may represent the parameter(s) in any suitable format, such as JSON, XML, YAML, or the like. In some implementations, the configuration(s) are to be stored in a version control system.

As further shown in FIG. 4, process 400 may include causing building of a configuration package corresponding to the one or more configurations (block 430). For example, the build system 210 (e.g., using processor 320, memory 330, and/or communication component 360) may cause building of a configuration package corresponding to the one or more configurations, as described above in connection with reference number 130 of FIG. 1B. As an example, the configuration package may include the one or more configurations and at least one additional configuration for at least one additional entity.

As further shown in FIG. 4, process 400 may include causing deployment of the configuration package to a first environment of an environment chain of the platform (block 440). For example, the build system 210 (e.g., using processor 320, memory 330, and/or communication component 360) may cause deployment of the configuration package to a first environment of an environment chain of the platform, as described above in connection with reference number 135 of FIG. 1C. As an example, deployment of the configuration package to the first environment may cause the one or more parameters of the one or more configurations to be written to a first database associated with the first environment.

As further shown in FIG. 4, process 400 may include causing, after deployment of the configuration package to the first environment, deployment of the configuration package to a second environment of the environment chain of the platform (block 450). For example, the build system 210 (e.g., using processor 320, memory 330, and/or communication component 360) may cause, after deployment of the configuration package to the first environment, deployment of the configuration package to a second environment of the environment chain of the platform, as described above in connection with reference number 155 of FIG. 1D. As an example, deployment of the configuration package to the second environment may cause the one or more parameters of the one or more configurations to be written to a second database associated with the second environment.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1D. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for automated deployment of configurations for a multi-tenant platform up an environment chain, the system comprising:
   one or more memories; and
   one or more processors, communicatively coupled to the one or more memories, configured to:
      receive information identifying one or more parameters for one or more configurations used to establish an entity in a software as a service (SaaS) platform that integrates services of a plurality of first entities with platforms of a plurality of second entities,
         wherein establishing the entity in the SaaS platform establishes the entity as one of the plurality of first entities or one of the plurality of second entities;
      cause generation of the one or more configurations using the one or more parameters,
         wherein the one or more configurations are to be stored in a version control system;
      cause building of a configuration package corresponding to the one or more configurations and at least one additional configuration for at least one additional entity of the plurality of first entities or the plurality of second entities;
      cause deployment of the configuration package to a non-production environment of the SaaS platform,
         wherein the deployment of the configuration package to the non-production environment causes the one or more parameters to be written to a first database associated with the non-production environment; and
      cause, responsive to testing information associated with the deployment of the configuration package to the non-production environment, deployment of the configuration package to a production environment of the SaaS platform,
         wherein the deployment of the configuration package to the production environment causes the one or more parameters to be written to a second database associated with the production environment.

2. The system of claim 1,
   wherein the one or more processors, to receive the information identifying the one or more parameters, are configured to:
      receive the information identifying the one or more parameters via a user interface.

3. The system of claim 1,
   wherein the one or more processors, to receive the information identifying the one or more parameters, are configured to:
      retrieve one or more sets of parameters associated with a current version for the one or more configurations;
      cause a user interface to be populated with information indicating the one or more sets of parameters; and
      receive the information identifying the one or more parameters via the user interface,
         wherein the one or more parameters are updates to the one or more sets of parameters.

4. The system of claim 1,
   wherein the SaaS platform is the multi-tenant platform.

5. The system of claim 1,
   wherein the configuration package makes the one or more configurations immutable between environments.

6. The system of claim 1,
   wherein the testing information indicates that deployment of the configuration package to the non-production environment has passed testing.

7. The system of claim 1,
   wherein the one or more processors, to cause deployment of the configuration package to the non-production environment or to the production environment, are configured to:
      provide the configuration package to a cloud computing system,
         wherein the configuration package being provided to the cloud computing system causes the cloud computing system to write the one or more parameters to the first database or the second database.

8. A method of automated deployment of configurations for a multi-tenant platform up an environment chain, comprising:
   retrieving, by a device from a version control system, a configuration package corresponding to one or more configurations, identifying one or more parameters, used to establish an entity in a platform that integrates services of a plurality of first entities with platforms of a plurality of second entities,
      wherein establishing the entity in the platform establishes the entity as one of the plurality of first entities or one of the plurality of second entities;
   causing, by the device, deployment of the configuration package to a first environment of the environment chain,
      wherein the deployment of the configuration package to the first environment causes the one or more parameters to be written to a first database associated with the first environment; and
   causing, by the device after the deployment of the configuration package to the first environment and responsive to testing information associated with the deployment of the configuration package to the first environment, deployment of the configuration package to a second environment of the environment chain, wherein the deployment of the configuration package to the second environment causes the one or more parameters to be written to a second database associated with the second environment.

9. The method of claim 8, further comprising:
retrieving one or more sets of parameters associated with a current version for the one or more configurations;
causing a user interface to be populated with information indicating the one or more sets of parameters; and
receiving information identifying the one or more parameters via the user interface,
wherein the one or more parameters are updates to the one or more sets of parameters.

10. The method of claim 8,
wherein the configuration package further corresponds to at least one additional configuration for at least one additional entity of the plurality of first entities or the plurality of second entities.

11. The method of claim 10,
wherein the one or more parameters are added or updated for the one or more configurations, and the at least one additional configuration is unchanged from a previous version.

12. The method of claim 8,
wherein the one or more configurations are stored in the version control system to cause an automated review of the one or more configurations to be performed.

13. The method of claim 8,
wherein the first environment is a non-production environment, and the second environment is a production environment.

14. The method of claim 8,
wherein the configuration package makes the one or more configurations immutable between environments of the environment chain.

15. A non-transitory computer-readable medium storing a set of instructions for automated deployment of a configuration package up an environment chain, the set of instructions comprising:
one or more instructions that, when executed by one or more processors of a device, cause the device to:
retrieve, from a version control system, a configuration package corresponding to one or more configurations used to establish an entity in a multi-tenant platform;
cause deployment of the configuration package to a first environment of the multi-tenant platform; and
cause, responsive to testing information associated with the deployment of the configuration package to the first environment, deployment of the configuration package to a second environment of the multi-tenant platform.

16. The non-transitory computer-readable medium of claim 15,
wherein the one or more instructions further cause the device to:
retrieve one or more sets of parameters associated with a current version for the one or more configurations;
cause a user interface to be populated with information indicating the one or more sets of parameters; and
receive information identifying one or more parameters via the user interface,
wherein the one or more parameters are updates to the one or more sets of parameters.

17. The non-transitory computer-readable medium of claim 15,
wherein the deployment of the configuration package to the first environment causes one or more parameters of the one or more configurations to be written to a first database associated with the first environment, and
wherein the deployment of the configuration package to the second environment causes one or more other parameters to be written to a second database associated with the second environment.

18. The non-transitory computer-readable medium of claim 15,
wherein the configuration package includes one or more artifacts based on the one or more configurations.

19. The non-transitory computer-readable medium of claim 15,
wherein the first environment is a non-production environment, and the second environment is a production environment.

20. The non-transitory computer-readable medium of claim 15,
wherein the configuration package further corresponds to at least one additional configuration for at least one additional entity, and
wherein the one or more configurations identify one or more parameters that are added or updated, and the at least one additional configuration is unchanged from a previous version.

* * * * *